United States Patent
Li et al.

(10) Patent No.: US 12,233,382 B2
(45) Date of Patent: Feb. 25, 2025

(54) EFFICIENT ANTIFOULING AND HYDROPHILIC POLYETHERSULFONE ULTRAFILTRATION MEMBRANE AND PREPARATION METHOD THEREOF

(71) Applicant: HANGZHOU NORMAL UNIVERSITY, Zhejiang (CN)

(72) Inventors: Yongjin Li, Zhejiang (CN); Chunjun Ni, Zhejiang (CN); Xin Zheng, Zhejiang (CN)

(73) Assignee: HANGZHOU NORMAL UNIVERSITY, Zhejiang (CN)

( * ) Notice: Subject to any disclaimer, the term of this patent is extended or adjusted under 35 U.S.C. 154(b) by 536 days.

(21) Appl. No.: 17/537,515

(22) Filed: Nov. 30, 2021

(65) Prior Publication Data

US 2022/0080367 A1    Mar. 17, 2022

Related U.S. Application Data

(63) Continuation of application No. PCT/CN2020/123403, filed on Oct. 23, 2020.

(30) Foreign Application Priority Data

Nov. 5, 2019  (CN) .......................... 201911071284.2

(51) Int. Cl.
  *B01D 71/68*   (2006.01)
  *B01D 61/14*   (2006.01)
  *B01D 67/00*   (2006.01)
  *B01D 69/02*   (2006.01)

(52) U.S. Cl.
  CPC .......... *B01D 71/68* (2013.01); *B01D 61/145* (2013.01); *B01D 67/0011* (2013.01); *B01D 67/0013* (2013.01); *B01D 67/00165* (2022.08); *B01D 67/00931* (2022.08); *B01D 69/02* (2013.01); *B01D 2323/08* (2013.01); *B01D 2323/12* (2013.01); *B01D 2323/34* (2013.01); *B01D 2323/385* (2013.01); *B01D 2325/36* (2013.01); *B01D 2325/48* (2013.01)

(58) Field of Classification Search
  CPC .... B01D 71/68; B01D 61/145; B01D 37/001; B01D 67/0013; B01D 67/00165; B01D 67/00931; B01D 69/02; B01D 2323/08; B01D 2323/12; B01D 2323/34; B01D 2323/385; B01D 2325/36; B01D 2325/48; B01D 65/08; B01D 67/00111; B01D 67/00113; B01D 71/78; B01D 67/0002; B01D 67/0006; B01D 67/0009; B01D 2325/002
  See application file for complete search history.

(56) References Cited

FOREIGN PATENT DOCUMENTS

CN         107044053    *   8/2017   ............ D06M 14/04

OTHER PUBLICATIONS

Machine English translation of CN107044053, Li et al. (Year: 2017).*

* cited by examiner

*Primary Examiner* — Jessica M Roswell (57) ABSTRACT

A preparation method of an antifouling and hydrophilic polyethersulfone ultrafiltration membrane includes through the $^{60}$Co-γ radiation grafting chemical modification method, evenly distributing an ionic liquid on a surface of a polyethersulfone material, wherein the ionic liquid containing unsaturated bonds is connected with the polyethersulfone material through chemical bonds, and then obtaining an asymmetric porous membrane by the immersion-precipitation phase transformation method, and finally performing Soxhlet extraction on the porous membrane, so as to migrate the grafted ionic liquid from an interior of the porous membrane to a surface of the porous membrane to be enriched, so that the adsorption and antibacterial properties of the porous membrane are improved. A mass ratio of the ionic liquid to the polyethersulfone material is in a range of (2-11):100. The ultrafiltration membrane is an asymmetric porous membrane, and has excellent antifouling properties, good pure water flux and a good BSA retention rate.

6 Claims, 5 Drawing Sheets

EFFICIENT ANTIFOULING AND HYDROPHILIC POLYETHERSULFONE ULTRAFILTRATION MEMBRANE AND PREPARATION METHOD THEREOF

CROSS REFERENCE OF RELATED APPLICATION

This is a Continuation Application of the International Application PCT/CN2020/123403, filed Oct. 23, 2020, which claims the benefit of CN 201911071284.2 and priority date of Nov. 5, 2019.

BACKGROUND OF THE PRESENT INVENTION

Field of Invention

The present invention belongs to the field of polymer material technology, and more particularly to a polymer composite material connected with an ionic liquid through chemical bonds and a preparation method of the polymer composite material, wherein the ionic liquid is evenly distributed on a surface of the polymer composite material.

Description of Related Arts

At present, the overall research and application level of membrane industry and technology in China, as well as the performance of membrane products, are still far behind foreign advanced technologies. Since membrane operation effect and life span are closely related to local water quality, and the antifouling performance of membranes in China is poor, it is necessary to strengthen the membrane science and technology research, develop new membrane materials, or find high-performance membrane material modification solutions, so as to obtain separation membranes with better performance including high hydrophilicity, high pollution resistance, and effective antibacterial property. Polyethersulfone (PES) as a material for preparing separation membranes has been used in the preparation of ultrafiltration membranes. The prepared PES ultrafiltration membrane also shows good thermal stability, strong mechanical properties and oxidation resistance, but it still has shortcomings, such as strong hydrophobicity and low separation efficiency. A large number of studies have confirmed that the hydrophobicity of the membrane directly affects the pollution trend of the membrane. The more hydrophobic the membrane is, the more likely it is to be polluted. Therefore, the present invention proposes an efficient antifouling, hydrophilic PES ultrafiltration membrane and a preparation method thereof.

Firstly, there are two main methods to improve the hydrophilicity of PES porous membranes. One method is to physically or chemically modify the surface of the membrane. For example, the PES porous membrane is subject to surface modification by ultraviolet or ozone. However, the surface modification of the membrane by this method may change the pore size and distribution of the membrane, resulting in the lack of other properties. Another method is bulk modification. Mixing PES with hydrophilic polymers or inorganic particles is a common method to achieve physical bulk modification. This method mainly uses hydrophilic polymers as pore formers, such as polyvinylpyrrolidone (PVP) and Polyethylene glycol (PEG). In the filtration process of a porous membrane which is prepared by mixing PES with PVP or PEG, due to the elution effect of PVP or PEG, the hydrophilicity of the porous membrane is only temporarily enhanced in hydrophilicity and is unable to be permanently modified. Moreover, another common method for bulk modification is to chemically modify the PES body. Chemical bulk modification is a feasible way to realize the molecular design of PES membrane materials, but harsh reaction conditions and corrosive reagents also have great limitations on the chemical bulk modification of PES. Therefore, an object of the present invention is to provide a permanent and efficient modification method.

The present invention relates to a modification method of grafting an ionic liquid (IL) by radiation. The reason is that (1) the irradiation grafting technology is mature and applied in many fields, (2) the irradiation grafting technology is able to permanently modify PES materials, (3) the irradiation grafting technology does not require chemical reagents, is simple to operate, and is environmentally friendly, and (4) the IL refers to a substance that is liquid at room temperature and is composed of ions, and the IL itself is a relatively hydrophilic substance, so when the IL is grafted onto PES molecular chains, the hydrophilicity of PES is greatly improved, thereby improving the antifouling performance of PES, and at the same time, the antibacterial properties of the IL is able to give PES porous membranes better antibacterial properties.

The method provided by the present invention comprises three steps of firstly fixing an IL to molecular chains of a matrix polymer through chemical bonds, and then obtaining a porous membrane through immersion-precipitation phase transformation method, and finally performing Soxhlet extraction on the porous membrane, so as to migrate the grafted IL from an interior of the porous membrane to a surface of the porous membrane to be enriched, so that the adsorption and antibacterial properties of the porous membrane are improved.

SUMMARY OF THE PRESENT INVENTION

Aiming at deficiencies of the prior art, an object of the present invention is to provide an efficient antifouling and hydrophilic ultrafiltration membrane and a preparation method thereof, characterized by using a "green solvent", namely, an ionic liquid (IL) to modify the polyethersulfone (PES) membrane, which greatly improves problems that the PES membrane is strong in hydrophobicity and is easy to be polluted without changing the performance and structure of the PES matrix, so that the ultrafiltration membrane has better hydrophilic and antifouling properties, and is also greatly improved in water flux, while retaining a better retention rate for bovine serum albumin (BSA).

According to the present invention, through the $^{60}$Co-$\gamma$ radiation grafting chemical modification method, an IL is evenly distributed on a surface of a PES material, wherein the IL is connected with the PES material through chemical bonds, and then an asymmetric porous membrane is obtained by the immersion-precipitation phase transformation method, and finally Soxhlet extraction is performed on the porous membrane, wherein a mass ratio of the IL to the PES material is in a range of (2-11):100.

The IL is an ionic liquid containing unsaturated bonds, and preferably, the ionic liquid containing unsaturated bonds is an imidazole ionic liquid whose cationic structural formula is wherein R1 is C1-C24 alkyl or C2-C24 alkenyl, R2 is C2-C24 alkenyl, an anion in the IL is $PF_6^-$, $BF_4^-$, $Br^-$, $Cl^-$, $I^-$, $NO_3^-$, $CF_3CO_2^-$, $CH_3COO^-$ or $(CF_3SO_3)_2N^-$.

Another object of the present invention is to provide a preparation method of the efficient antifouling and hydrophilic polymer porous membrane.

The preparation method comprises steps of:
(1) obtaining a mixed solution by mixing a polymer with an ionic liquid (IL) and a solvent according to a certain ratio in a reactor, wherein the solvent is N,N-dimethylformamide, and mixing the polymer with the ionic liquid and the solvent at 60° C.;
(2) obtaining a mixed PES/IL blend film by casting the mixed solution, followed by removing the solvent by drying;
(3) obtaining an IL grafted PES (PES-g-IL) film by performing radiation on the mixed PES/IL blend film in a polyethylene plastic bag, wherein the radiation is $^{60}$Co-γ radiation at room temperature in air or nitrogen environment with a radiation dose of 30 kGy; and
(4) preparing the PES-g-IL film into a solution, and obtaining a PES-g-IL porous membrane from the solution through immersion-precipitation phase inversion method.

Preferably, the step (4) specifically comprises preparing the PES-g-IL film into a casting solution with a certain concentration, coating the casting solution on a glass plate with a scraper having a groove with a depth of 100 and obtaining the PES porous membrane through solvent exchange by immersing the glass plate in a coagulation bath.

Preferably, the preparation method further comprises performing Soxhlet extraction on the PES porous membrane, so as to enrich the ionic liquid on a surface of the PES porous membrane.

More preferably, performing Soxhlet extraction on the PES porous membrane at a temperature in a range of 80° C. to 120° C. for 1 h to 48 h in methanol.

Beneficial effects of the present invention are as follows.

The modified PES membrane of the present invention exhibits excellent antifouling performance, better pure water flux and BSA retention rate.

In the present invention, the adsorbed dose of $^{60}$Co-γ radiation will affect the structure of PES-g-IL porous membrane (such as pore size and distribution) by determining the degree of grafting of IL, so that the water flux and the retention rate of PES-g-IL porous membrane will increase at the same time.

The porous membrane provided by the present invention is an asymmetric membrane. The asymmetric membrane comprises a dense layer and a supporting layer, which ensures a larger flux as well as selectivity.

In the present invention, the porous membrane is processed by Soxhlet extraction to enrich the functional components on the surface of the porous membrane, which is able to maximize the performance of the modified PES membrane. Soxhlet extraction technology enriches the ionic liquid on the surface of the porous membrane, which has a good antifouling and hydrophilic effect.

BRIEF DESCRIPTION OF THE DRAWINGS

FIGS. 1-1(1)-FIGS. 1-1(6) are SEM images of the first comparative example (pure PES porous membrane), the first embodiment (2 wt % IL-PES modified porous membrane), the second embodiment (4 wt % IL-PES modified porous membrane), the third embodiment (6 wt % IL-PES modified porous membrane), the fourth embodiment (10 wt % IL-PES modified porous membrane) and the second comparative example (10 wt %-PES-electron beam radiated porous membrane), respectively, wherein a, b and c are microstructure of the cross section, upper surface and lower surface of every sample, respectively.

FIG. 1-2(1) and FIG. 1-2(2) are SEM images of the fourth embodiment (10 wt % IL-PES modified porous membrane) and the fifth embodiment (10 wt % IL-PES extracted modified porous membrane), respectively, wherein a, b and c are microstructure of the cross section, upper surface and lower surface of every sample, respectively.

FIG. 1-3(a) and FIG. 1-3(b) are SEM element analysis diagrams of the fifth embodiment (10 wt % IL-PES extracted modified porous membrane) and the fourth embodiment (10 wt % IL-PES modified porous membrane), respectively.

FIG. 2-1 is a contact angle diagram of the first comparative example (pure PES porous membrane), the first embodiment (2 wt % IL-PES modified porous membrane), the second embodiment (4 wt % IL-PES modified porous membrane), the third embodiment (6 wt % IL-PES modified porous membrane), the fourth embodiment (10 wt % IL-PES modified porous membrane) and the second comparative example (10 wt %-PES-electron beam radiated porous membrane).

FIG. 2-2 is a contact angle diagram of the fourth embodiment (10 wt % IL-PES modified porous membrane) and the fifth embodiment (10 wt % IL-PES extracted modified porous membrane).

FIG. 4-1 is a flux recovery and loss diagram of the first comparative example (pure PES porous membrane), the first embodiment (2 wt % IL-PES modified porous membrane), the second embodiment (4 wt % IL-PES modified porous membrane), the third embodiment (6 wt % IL-PES modified porous membrane), the fourth embodiment (10 wt % IL-PES modified porous membrane) and the second comparative example (10 wt %-PES-electron beam radiated porous membrane).

FIG. 4-2 is a flux recovery and loss diagram of the fourth embodiment (10 wt % IL-PES modified porous membrane) and the fifth embodiment (10 wt % IL-PES extracted modified porous membrane).

DETAILED DESCRIPTION OF THE PREFERRED EMBODIMENT

The present invention is explained in detail with reference to drawings and embodiments, but the present invention is not limited to the scope of these embodiments.

In the embodiments and comparative examples thereof provided by the present invention, the polymer PES (polyethersulfone) is used as the matrix. The polymer PES is produced by BASF SE and has the model of ULTRASON E6020P.

The imidazole ionic liquid (IL) containing unsaturated bonds used in the embodiments is 1-vinyl-3-butylimidazole tetrafluoroborate solution.

First Embodiment

Step (1): firstly, add 9.8 g of PES and 0.2 g of 1-vinyl-3-butylimidazole tetrafluoroborate solution into a reactor, mix at 60° C. for 6 h, cool down to room temperature, pour into a PTFE (poly tetra fluoroethylene) mold, volatilize solvent and dry under vacuum for 24 h to form a PES/IL blend film, and obtain an IL grafted PES (PES-g-IL) film by radiating the PES/IL blend film at an adsorbed dose of 30 kGy under room temperature, wherein $^{60}$Co-γ is a radiation source.

Step (2): perform Soxhlet extraction with methanol for 24 h and followed by vacuum drying on the PES-g-IL film obtained by the step (1), prepare a casting solution with a concentration of 20% from the extracted film, coat the casting solution on a glass plate, and obtain a 2 wt % IL-PES modified porous membrane through immersion-precipitation phase inversion method in a coagulation bath.

Second Embodiment

Step (1): firstly, add 9.6 g of PES and 0.4 g of 1-vinyl-3-butylimidazole tetrafluoroborate solution into a reactor, mix at 60° C. for 6 h, cool down to room temperature, pour into a PTFE (poly tetra fluoroethylene) mold, volatilize solvent and dry under vacuum for 24 h to form a PES/IL blend film, and radiate the PES/IL blend film at an adsorbed dose of 30 kGy under room temperature, wherein $^{60}$Co-γ is a radiation source.

Step (2): perform Soxhlet extraction with methanol for 24 h and followed by vacuum drying on the radiated film obtained by the step (1), prepare a casting solution with a concentration of 20% from the extracted film, coat the casting solution on a glass plate, and obtain a 4 wt % IL-PES modified porous membrane through immersion-precipitation phase inversion method in a coagulation bath.

Third Embodiment

Step (1): firstly, add 9.4 g of PES and 0.6 g of 1-vinyl-3-butylimidazole tetrafluoroborate solution into a reactor, mix at 60° C. for 6 h, cool down to room temperature, pour into a PTFE (poly tetra fluoroethylene) mold, volatilize solvent and dry under vacuum for 24 h to form a PES/IL blend film, and radiate the PES/IL blend film at an adsorbed dose of 30 kGy under room temperature, wherein $^{60}$Co-γ is a radiation source.

Step (2): perform Soxhlet extraction with methanol for 24 h and followed by vacuum drying on the radiated film obtained by the step (1), prepare a casting solution with a concentration of 20% from the extracted film, coat the casting solution on a glass plate, and obtain a 6 wt % IL-PES modified porous membrane through immersion-precipitation phase inversion method in a coagulation bath.

Fourth Embodiment

Step (1): firstly, add 9.0 g of PES and 1.0 g of 1-vinyl-3-butylimidazole tetrafluoroborate solution into a reactor, mix at 60° C. for 6 h, cool down to room temperature, pour into a PTFE (poly tetra fluoroethylene) mold, volatilize solvent and dry under vacuum for 24 h to form a PES/IL blend film, and radiate the PES/IL blend film at an adsorbed dose of 30 kGy under room temperature, wherein $^{60}$Co-γ is a radiation source.

Step (2): perform Soxhlet extraction with methanol for 24 h and followed by vacuum drying on the radiated film obtained by the step (1), prepare a casting solution with a concentration of 20% from the extracted film, coat the casting solution on a glass plate, and obtain a 10 wt % IL-PES modified porous membrane through immersion-precipitation phase inversion method in a coagulation bath.

Fifth Embodiment

Perform surface treatment on the 10 wt % IL-PES modified porous membrane prepared by the fourth embodiment at 100° C. for 48 h, and obtain a 10 wt % IL-PES extracted modified porous membrane after drying.

First Comparative Example

Step (1): firstly, add 10.0 g of PES into a reactor, dissolve at 60° C. for 6 h, cool down to room temperature, pour into a PTFE mold, volatilize solvent and dry under vacuum for 24 h to form a PES film.

Step (2): prepare a casting solution with a concentration of 20%, coat the casting solution on a glass plate, and obtain a pure PES porous membrane through immersion-precipitation phase inversion method in a coagulation bath.

Second Comparative Example

Step (1): firstly, add 9.0 g of PES and 1.0 g of 1-vinyl-3-butylimidazole tetrafluoroborate solution into a reactor, mix at 60° C. for 6 h, cool down to room temperature, pour into a PTFE (poly tetra fluoroethylene) mold, volatilize solvent and dry under vacuum for 24 h to form a PES/IL blend film, and radiate the PES/IL blend film at an adsorbed dose of 30 kGy under room temperature, wherein an electron beam is a radiation source.

Step (2): perform Soxhlet extraction with methanol for 24 h and followed by vacuum drying on the radiated film obtained by the step (1), prepare a casting solution with a concentration of 20% from the extracted film, coat the casting solution on a glass plate, and obtain a 10 wt %-PES-electron beam radiated porous membrane through immersion-precipitation phase inversion method in a coagulation bath.

The structure and properties of the porous membranes obtained by the first, second, third and fourth embodiments and the first and second comparative examples are characterized systematically.

As shown in FIGS. 1-1(1)-FIGS. 1-1(6), the 2 wt % IL-PES modified porous membrane obtained by the first embodiment, the 4 wt % IL-PES modified porous membrane obtained by the second embodiment, the 6 wt % IL-PES modified porous membrane obtained by the third embodiment, the 10 wt % IL-PES modified porous membrane obtained by the fourth embodiment, the pure PES porous membrane obtained by the first comparative example, and the 10 wt %-PES-electron beam radiated porous membrane obtained by the second comparative example are analyzed with SEM (scanning electron microscope). It is able to seen that the grafting of ionic liquid has a great influence on the membrane structure of PES. The number of finger pores is increased significantly, the distribution density thereof is increased, the pore size on the upper surface of the membranes are increased, and the finger pores are more penetrating. It is believed that the grafting of the ionic liquid leads to the improvement of hydrophilicity of molecular chains of PES, which accelerates the diffusion rate of molecular chains into the coagulation bath, so that the membrane pores are increased in number and size. This explains the subsequent increase in flux. However, the sample which takes the electron beam as the radiation source is unable to be grafted with the ionic liquid, so that the hydrophilic modification effect of the ionic liquid to PES is unable to be reflected, and there is no obvious effect on the morphology of the membrane pores.

According to FIG. 1-2(1) and FIG. 1-2(2), the microstructure of PES modified porous membrane has not changed significantly after subjecting to Soxhlet extraction, indicating that the surface treatment by Soxhlet extraction has little effect on the pore structure of the PES modified porous membrane.

FIG. 1-3(a) and FIG. 1-3(b) are SEM element analysis diagrams of the fourth embodiment (10 wt % IL-PES modified porous membrane) and the fifth embodiment (10 wt % IL-PES extracted modified porous membrane), respectively. The results show that the grafted ionic liquid is able to migrate to the surface of the PES modified porous membrane after Soxhlet extraction. Therefore, the SEM element analysis diagram of the fifth embodiment shows more characteristic elements of the ionic liquid.

As shown in Table 1, the grafting of ionic liquid significantly improves the BSA retention rate of the PES modified porous membrane, which is mainly due to the improved hydrophilicity because of the grafting of ionic liquid. The ionic liquid is able to form a layer of water membrane on the surface of the porous membrane, so as to retain BSA macromolecules, and simultaneously, the dense pores on the surface of the porous membrane are also able to play a role in the retention of these macromolecules. However, in the second comparative example, since the ionic liquid is unable to be grafted, the retention performance of the porous membrane to BSA is not improve significantly.

Figure 22:
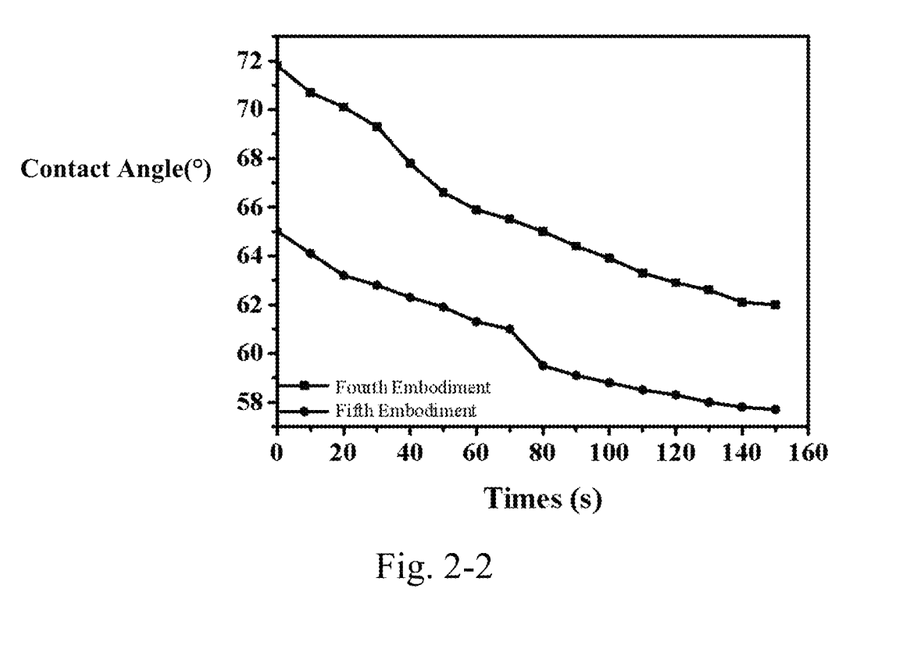

FIG. 2-2 is a contact angle diagram of the fourth embodiment (10 wt % IL-PES modified porous membrane) and the fifth embodiment (10 wt % IL-PES extracted modified porous membrane). The results show that the contact angle of the 10 wt % IL-PES extracted modified porous membrane provided by the fifth embodiment is lower after extraction process, showing better hydrophilicity.

Figures 1, 3A:
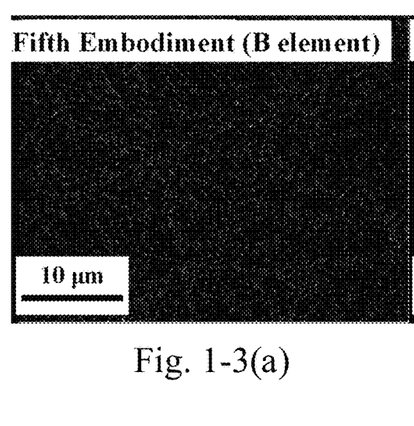
FIG. 3 is a pure water flux diagram of the first comparative example (pure PES porous membrane), the first embodiment (2 wt % IL-PES modified porous membrane), the second embodiment (4 wt % IL-PES modified porous membrane), the third embodiment (6 wt % IL-PES modified porous membrane), the fourth embodiment (10 wt % IL-PES modified porous membrane) and the second comparative example (10 wt %-PES-electron beam radiated porous membrane).
Figures 1, 3B:
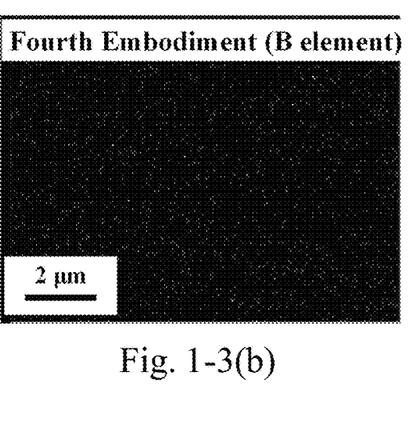
Figure 3:
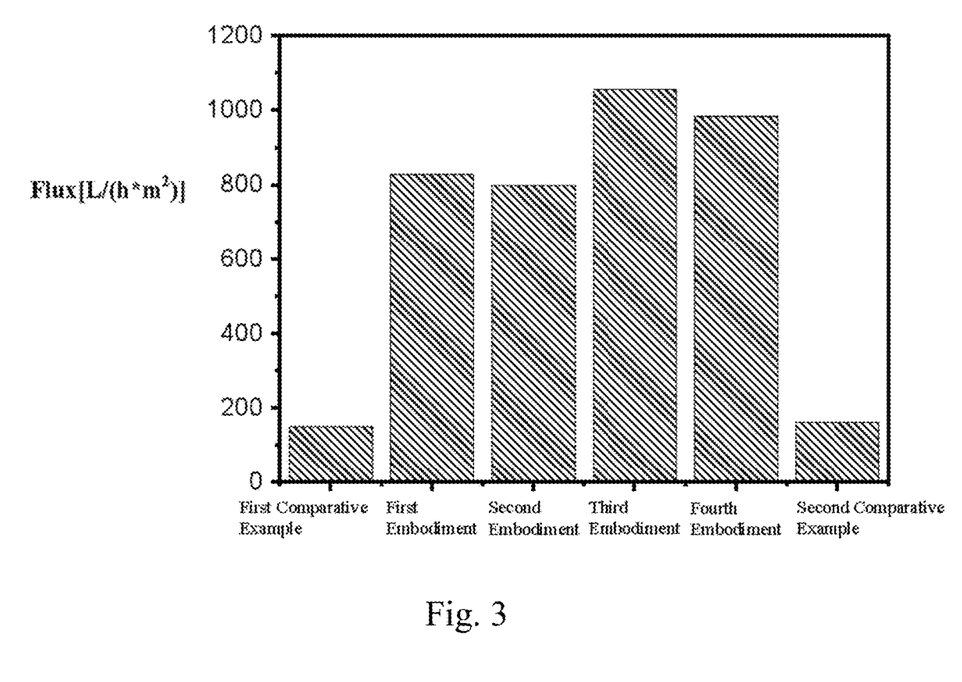
Figure 11:
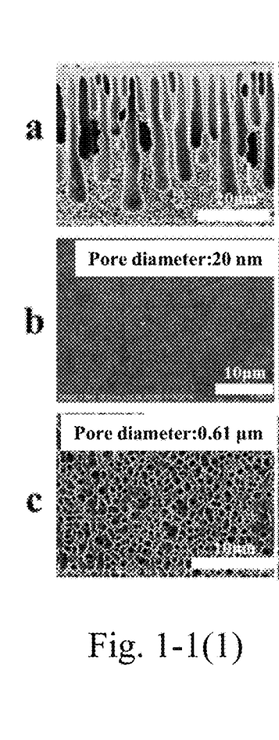
Figure 12:
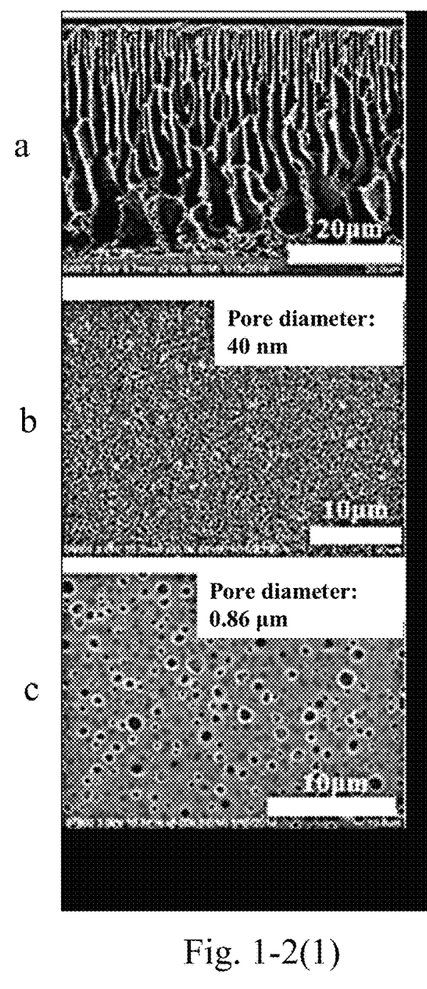

FIG. 3 is a pure water flux diagram of the first embodiment (2 wt % IL-PES modified porous membrane), the second embodiment (4 wt % IL-PES modified porous membrane), the third embodiment (6 wt % IL-PES modified porous membrane), the fourth embodiment (10 wt % IL-PES modified porous membrane), the first comparative example (pure PES porous membrane) and the second comparative example (10 wt %-PES-electron beam radiated porous membrane). The above-mentioned phenomena, such as the increase of the diameter of membrane pores on the upper and lower surfaces of the porous membrane, the more penetrating finger pores, and the improvement of hydrophilicity, are responsible for the greatly improved pure water flux of the PES modified porous membrane.

Figure 41:
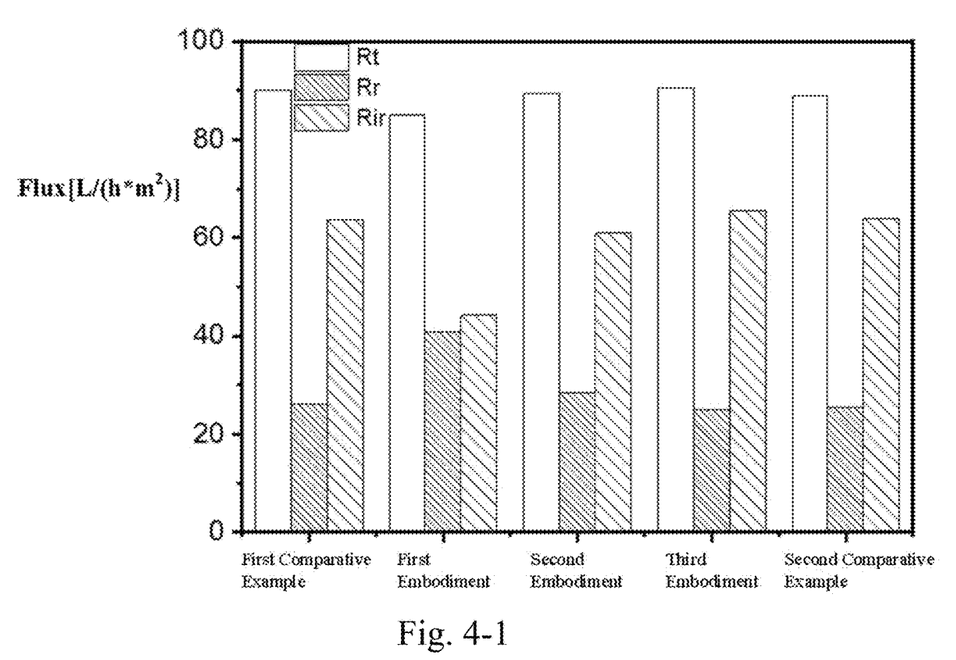

FIG. 4-1 is a flux recovery and loss diagram of the first embodiment (2 wt % IL-PES modified porous membrane), the second embodiment (4 wt % IL-PES modified porous membrane), the third embodiment (6 wt % IL-PES modified porous membrane), the first comparative example (pure PES porous membrane), and the second comparative example (10 wt %-PES-electron beam radiated porous membrane). $R_t$, $R_r$ and $R_{ir}$ represent total loss flux, reversible loss flux and irreversible loss flux, respectively. Therefore, it is concluded that the PES porous membrane grafted with the ionic liquid loses less flux, and the flux that is able to be recovered after BSA contamination is greater. As a result, it is believed

TABLE 1

Determination of BSA retention rate of BSA provided by the embodiments (PES modified porous membrane with different ionic liquid content) and comparative examples

| Sample name | First Comparative Example | First Embodiment | Second Embodiment | Third Embodiment | Fourth Embodiment | Fifth Embodiment | Second Comparative Example |
|---|---|---|---|---|---|---|---|
| BSA Retention Rate (%) | 40 | 80 | 73 | 79 | 83 | 85 | 45 |

Figure 21:
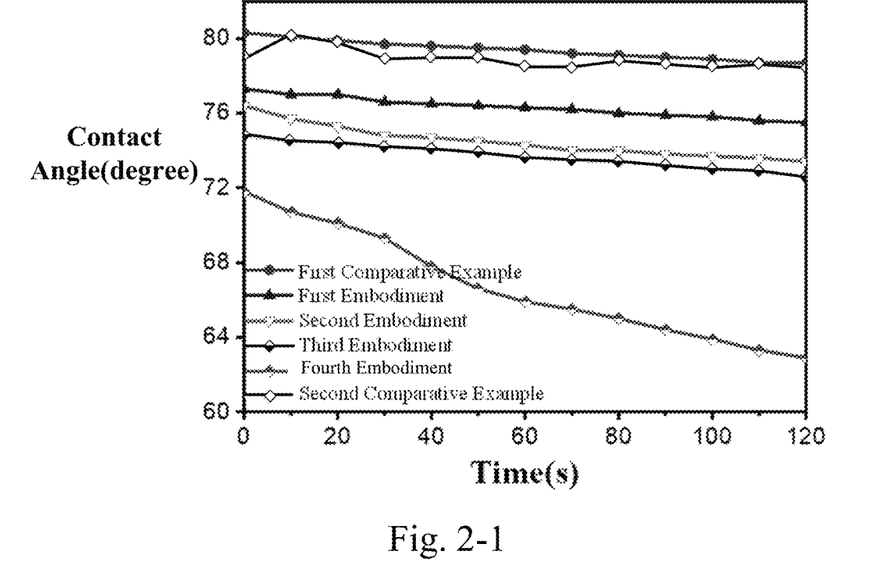

FIG. 2-1 is a contact angle diagram of the first embodiment (2 wt % IL-PES modified porous membrane), the second embodiment (4 wt % IL-PES modified porous membrane), the third embodiment (6 wt % IL-PES modified porous membrane), the fourth embodiment (10 wt % IL-PES modified porous membrane), the first comparative example (pure PES porous membrane), and the second comparative example (10 wt %-PES-electron beam radiated porous membrane). It is able to be seen that the ionic liquid itself has good hydrophilicity, and the PES grafted with the ionic liquid also shows the improvement of the hydrophilicity. As the content of the ionic liquid increases, the contact angle of the porous membrane becomes smaller and smaller, which also highlights an important feature of the present invention that the grafting of ionic liquid has a hydrophilic modification effect on PES, and with the improvement of hydrophilicity, the antifouling performance of the PES modified porous membrane grafted with the ionic liquid is greatly improved. The reason is that the improvement of hydrophilicity leads to the formation of a layer of water membrane on the surface of the PES porous membrane, which improves the antifouling performance of the PES membrane.

that the PES-g-IL porous membrane has antifouling property. Besides, PES-g-IL porous membrane is able to prevent protein contamination and recover flux performance after BSA filtration, which is also the main object of the present invention.

Figure 42:
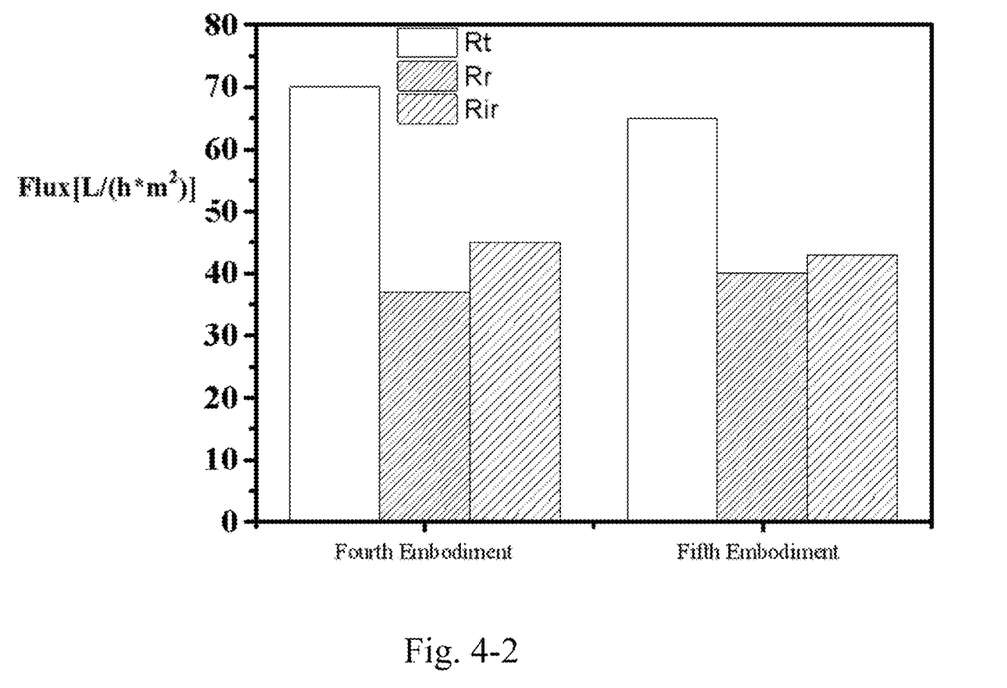

As shown in FIG. 4-2, the fifth embodiment shows lower total loss flux, irreversible loss flux and higher reversible loss flux, indicating that the grafted ionic liquid is able to migrate to the surface of the PES modified porous membrane, so the 10 wt % IL-PES extracted modified porous membrane has better antifouling performance.

The above-mentioned embodiments are not a limitation of the present invention, and the present invention is not limited to the above-mentioned embodiments. Any content that meets the requirements of the present invention belongs to the protection scope of the present invention.

What is claimed is:

1. A preparation method of an efficient antifouling and hydrophilic polyethersulfone (PES) ultrafiltration membrane, the preparation method comprising steps of:

(1) obtaining a mixed solution by mixing a PES solution with an ionic liquid (IL) and a solvent according to a mass ratio in a reactor, wherein the mass ratio of the ionic liquid to the PES solution is in a range of (2-11):100, the ionic liquid is an ionic liquid containing unsaturated bonds;
(2) obtaining a mixed PES/IL blend film by casting the mixed solution, followed by removing the solvent by drying;
(3) obtaining an IL grafted PES (PES-g-IL) film by performing radiation on the mixed PES/IL blend film in a polyethylene plastic bag, wherein the radiation is $^{60}$Co-γ radiation at room temperature in air or nitrogen environment with a radiation dose of 30 kGy; and
(4) preparing the PES-g-IL film into a solution, and obtaining a PES-g-IL porous membrane from the solution through immersion-precipitation phase inversion method.

2. The preparation method according to claim 1, further comprising performing Soxhlet extraction on the PES-g-IL porous membrane, so as to enrich the ionic liquid on a surface of the PES-g-IL porous membrane.

3. The preparation method according to claim 1, wherein the ionic liquid containing unsaturated bonds is an imidazole ionic liquid whose cationic structural formula is wherein R1 is C1-C24 alkyl or C2-C$_{24}$ alkenyl, R2 is C2-C24 alkenyl, an anion in the ionic liquid is $PF_6^-$, $BF_4^-$, $Br^-$, $Cl^-$, $I^-$, $NO_3^-$, $CF_3CO_2^-$, $CH_3COO^-$ or $(CF_3SO_3)_2N^-$.

4. The preparation method according to claim 2, wherein performing Soxhlet extraction on the PES-g-IL porous membrane at a temperature in a range of 80° C. to 120° C. for 1 h to 48 h in methanol.

5. The preparation method according to claim 1, wherein in the step (1), mixing the PES solution with the ionic liquid at 60° C.

6. The preparation method according to claim 1, wherein in the step (1), the solvent is N,N-dimethylformamide.

* * * * *